United States Patent Office 3,107,881
Patented Oct. 22, 1963

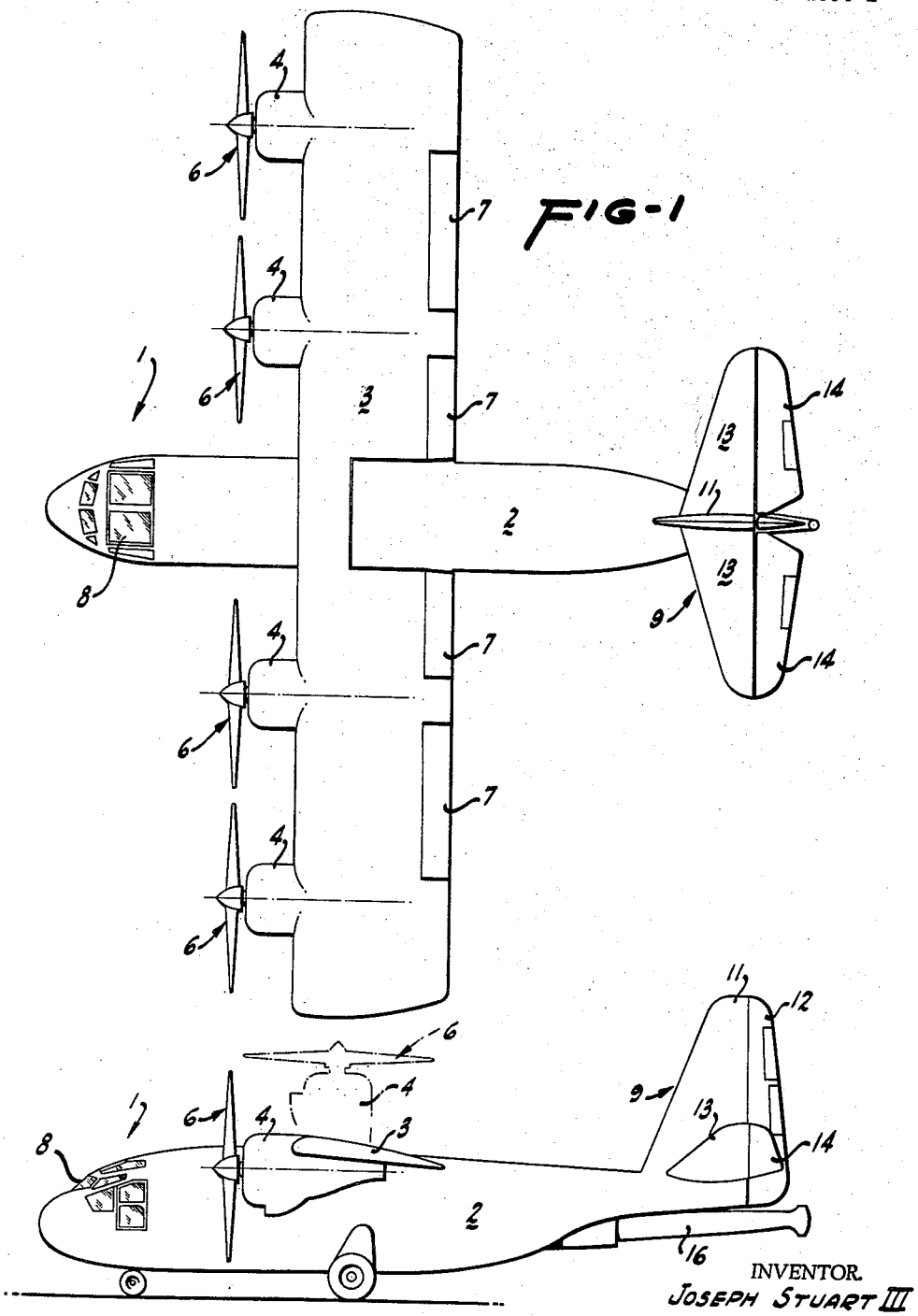

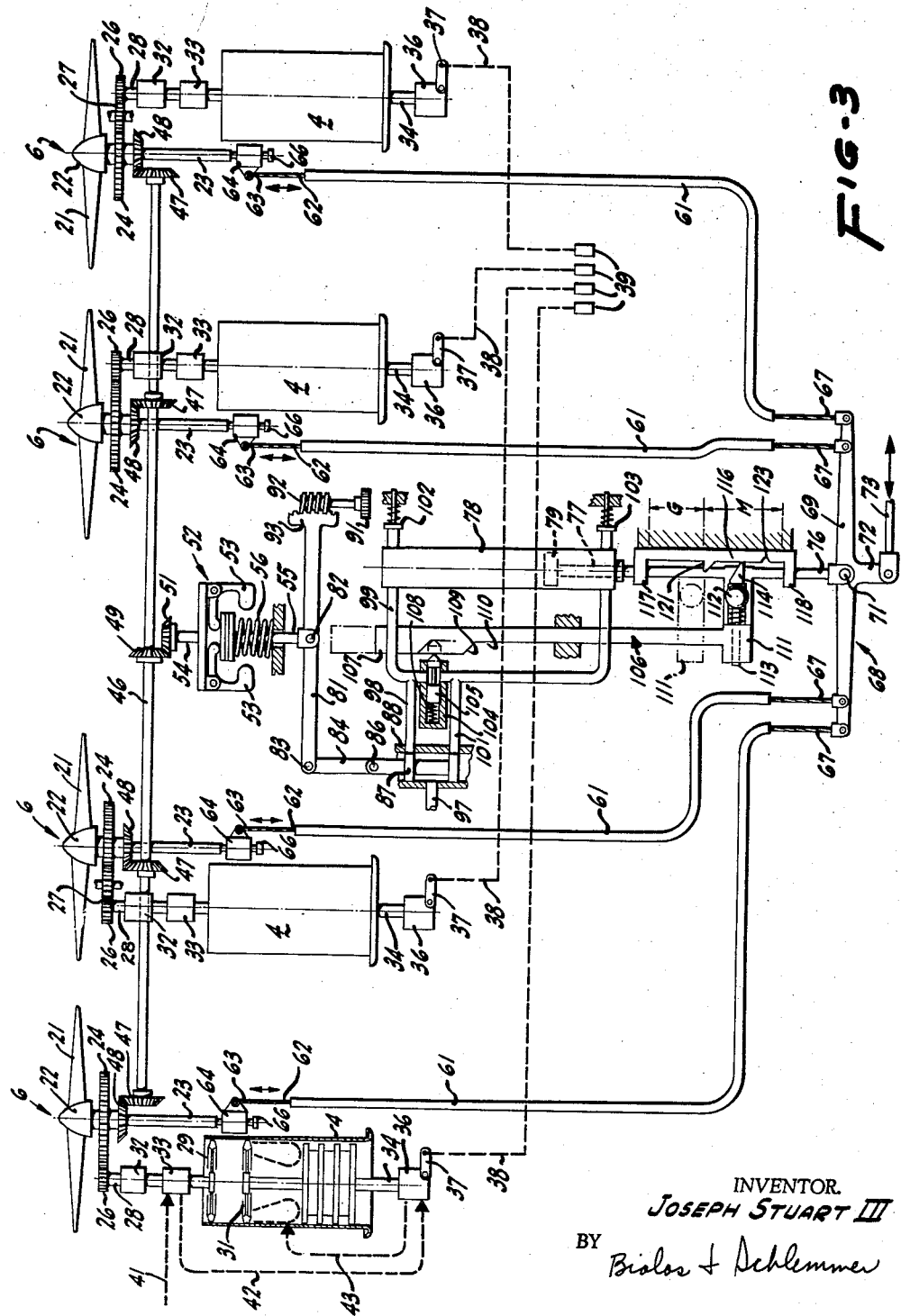

3,107,881
CONTROL SYSTEM FOR INTERCONNECTED
PROPELLERS
Joseph Stuart III, Redondo Beach, Calif., assignor, by mesne assignments, to The Electric Auto-Lite Company, Toledo, Ohio, a corporation of Ohio
Filed July 25, 1962, Ser. No. 212,256
5 Claims. (Cl. 244—7)

This invention relates generally to an aircraft control system, and more particularly to a control system for operatively interconnected thrust producing propellers of an aircraft.

Still more particularly this invention relates to an integrated system for controlling the blade pitch setting and speed of rotation of each propeller construction of a multipropeller aircraft for the purpose of adjusting or maintaining, automatically when desired, and manually when desired, a selected degree of symmetrical propeller thrust or a selected degree of asymmetrical propeller thrust. To this end, the subject control system includes means for automatically controlling propeller blade thrust, and also includes pilot operable means for inactivating such automatic control means so that manual thrust control may be effected.

In multipropeller aircraft it is necessary during flight that the thrust produced by each propeller is maintained in close conformity with the thrust produced by the other propellers in order to avoid an undersirable condition of thrust imbalance. With conventional fixed wing aircraft where merely symmetrical thrust across the plurality of propellers is desired, desired flight conditions can normally be achieved merely by equalizing the governed propeller speed and the engine power settings. However, in the case of vertical take-off and landing (VTOL) tilt-wing aircraft in which the wing structure is pivotal between a generally level or horizontal position and a generally upright or vertical position, asymmetrical thrust frequently is desired.

With VTOL aircraft it is possible to introduce thrust differential control effects onto the aircraft for imparting roll control to the aircraft when the pivotal wing is in the upright or vertical position for vertical flight; for imparting yaw control to the aircraft when the pivotal wing is in the level or horizontal position during forward cruising flight; and for imparting proportionately both roll and yaw control, in conjunction with the aircraft ailerons, when the pivotal wing is in an intermediate transitional position.

Accordingly, this invention has particular utility and is designed primarily for employment with VTOL tilt-wing aircraft capable of vertical take-off and landing and in-flight transition for forward cruise flight as a conventional fixed wing aircraft. To this end, this invention employs governor controlled means for selectively modifying the pitch of each propeller of a multipropeller aircraft in unison, and manually operable override means for rendering ineffective the governor controlled means during certain flight or on-the-ground conditions so that propeller pitch may be selectively modified by the pilot. The thrust imparted to the aircraft may thus be regulated as required.

From the foregoing it should be understood that objects of this invention include the provision of a thrust control system for interconnected propellers; the provision of means in a control system for automatically regulating propeller pitch under predetermined flight conditions; the provision of pilot operable override means for rendering ineffective such automatic control means; the provision of differential control means for selectively modifying differentially but in unison the pitch of the propellers along opposite sides of the aircraft to produce asymmetrical thrust for roll control during vertical flight and yaw control during horizontal flight; and the provision of a single integrated control system for interconnected aircraft propellers which is particularly useful with VTOL multipropeller tilt-wing aircraft.

Other objects and advantages of this invention will become apparent from the following disclosure in which reference is directed to the accompanying drawings.

FIG. 1 is a top plan view of a tilt-wing VTOL aircraft of the type with which the subject control system is effectively employable;

FIG. 2 is a side elevational view of the tilt-wing aircraft of FIG. 1;

FIG. 3 is a diagrammatic schematic view of the subject control system illustrated in conjunction with a bank of operatively interconnected propellers employed with a tilt-wing aircraft of the type shown in FIGS. 1 and 2.

The showing of FIG. 3 is primarily diagrammatic for clarity of illustration, but it should be understood that the various pilot controls hereinafter mentioned are to be located for convenient access at the pilot's station of the subject aircraft. Also, the motion transmitting means between the various components of the control system and the propellers have been generally schematically illustrated because various known aircraft motion transmitting arrangements can be employed which would be effective in all wing tilt positions of the aircraft.

Referring first to FIGS. 1 and 2, the subject invention, as noted previously, is effectively employable with a VTOL tilt-wing aircraft 1 which comprises a fuselage 2 having a pivotal wing structure 3 extending transversely of the longitudinal axis of the fuselage. The wing structure is selectively pivotal or tiltable between the generally level or horizontal position shown in solid lines in FIGS. 1 and 2 and the upright or vertical position shown in dotted lines in FIG. 2.

In this regard, when the wing is in the upright position, the aircraft is adapted for vertical flight during take-off and landing, or during hovering. When the wing is in the level position, the aircraft is adapted for conventional forward cruise flight generally as a conventional fixed wing aircraft. An aircraft of the type illustrated is designed for in-flight transition so that wing movement may be selectively effected between the horizontal and vertical positions. As a result, vertical take-off followed by conventional forward cruise flight and subsequent vertical landing may be effected. The mechanism for selectively pivoting the wing structure 3 between its various operative positions has not been illustrated in that the same forms no part of this invention.

The wing structure 3 has mounted thereon a plurality or bank of port and starboard engines 4, each of which when actuated rotates a variable pitch propeller construction 6 driven thereby.

The engine and propeller constructions are mounted on the wing structure for movement with the wing. As a result, the air stream generated by the propellers may be selectively directed rearwardly of the aircraft generally parallel to the longitudinal axis of the fuselage to produce forward thrust during forward cruise flight, or downwardly of the aircraft generally normal to such axis to produce upward thrust during vertical take-off, landing and hovering flight. In this regard, it should be understood that modification of the thrust produced on one side of the fuselage relative to the thrust produced on the other side of the fuselage will produce yaw control moments when the wing structure is in the level position while such thrust modification will produce roll control moments when the wing structure is in the upright position. Such differential thrust may be selectively effected by varying the blade pitch setting of the port propellers relative to the starboard propellers.

It is to changes in the propeller blade pitch setting that the subject invention primarily relates. As will be described, pitch change may be effected uniformly in all propellers for modifying total propeller thrust, or differentially for imparting control moments to the aircraft about an axis directed generally perpendicular to the wing chord.

Also mounted on the wing structure 3 are a series of control ailerons 7 located in the propeller induced air streams which may be operated differentially to generate moments about an axis directed generally parallel to the wing chord by any suitable pilot control arrangement (not shown).

With the wing in the level, airplane type flight position, differential propeller pitch setting changes yaw the aircraft while differential aileron setting changes roll the aircraft. With the wing in the vertical, hovering flight position, differential propeller pitch setting changes roll the aircraft while differential aileron setting changes yaw the aircraft. At intermediate wing angle settings a proper ratio of differential propeller pitch and differential aileron action may be mechanically or otherwise provided to impart roll or yaw moments to the aircraft as desired. Differential propeller pitch change for yaw control may be eliminated completely in wing down airplane type flight if a conventional rudder is provided on the aircraft.

It should also be understood that the roll control effect of the ailerons progressively decreases as the wing structure is pivoted from the level position toward the upright position, while the aileron yaw control effect progressively increases under such condition. Conversely, the roll control effect of the ailerons progressively increases as the wing is pivoted from the upright position toward the level position, while the yaw control effect thereof progressively decreases.

At its forward end the fuselage 2 is provided with a pilot's station 8 for accommodating one or more pilots, each of which preferably has ready access to the manual pilot controls hereinafter described.

At its aft end the fuselage is provided with a generally convetnional tail structure 9 including an upright stabilizing structure 11 including an optional pivotally mounted rudder 12 which is employable for regulating aircraft yaw during forward cruise flight. The tail rudder may be regulated by conventional pilot operable foot pedals (not shown) in the well known manner.

Horizontal stabilizers 13 project from opposite sides of the tail structure and include pilot operable elevator flaps 14 for regulating pitch of the aircraft during forward cruise flight. The elevator flaps are to be regulated by the pilot in any well known manner, such as by a fore and aft movement of a control column.

As seen in FIG. 2, for regulating pitch of the aircraft during vertical flight or hovering when the elevators 14 are generally ineffective, a jet thrust pipe 16 may be provided which is regulatable by the aircraft pilot in any suitable manner for selectively directing an air stream upwardly or downwardly. Alternatively, a tail rotor propeller mounted for rotation in a horizontal plane may be employed for controlling pitch during vertical flight if preferred.

While the subject control system has been illustrated in conjunction with a four-propeller aircraft in which a pair of propellers are located on each side of the fuselage, it should be understood that the concept herein disclosed is applicable to aircraft employing more than or less than four propellers symmetrically arranged in groups on opposite sides of the fuselage.

The subject control system embodies means which is automatically or manually controllable for modifying in unison or in the same direction the pitch of each propeller employed on the aircraft. Additionally, the subject invention includes pilot control means in conjunction with the just mentioned means for differentially modifying the pitch of the propellers on the starboard side of the aircraft relative to the blades on the port side. Differential pitch change is effective for modifying aircraft yaw when the wing structure is level and roll when the wing structure is vertical, and for regulating both roll and yaw in varying and changing degrees when the wing structure is in any position of transition between the horizontal and vertical.

While a control system for automatically regulating pitch change of a series of operatively interconnected propellers has been generally known in the art heretofore, as shown in the patent to Mader No. 2,280,654, dated April 21, 1942, such known control system has made no provision for overriding the automatic control function by the pilot. Accordingly, this invention is specifically directed to a control system which includes an automatically governed pitch change arrangement but which also includes a pilot operable override control arrangement for rendering ineffective and deactivating the automatic control when desired for certain flight conditions not normally encountered with conventional fixed wing aircraft. Reference is now directed to the schematic diagram of the improved control system of this invention shown in FIG. 3. The respective port and starboard propeller constructions 6 each comprises a series of blades 21 radiating from a hub 22. Each blade of the respective propellers is rotatably mounted in its associated hub so that the pitch thereof may be selectively adjusted to any predetermined negative, zero or positive thrust setting by suitable pitch change structure (not shown) located in the hub. In this regard, various pitch change arrangements of a mechanical, electrical or hydraulic nature are available and may be employed. By way of example, reference is directed to the aforementioned Mader patent for a hydraulic pitch change system which could effectively be employed.

Each propeller hub 22 is mounted on a rotatable hollow shaft 23 which has secured thereto a circular gear 24. Each gear 24 is driven from an associated engine 4 by a cooperable drive gear 26. The gears 24 and 26 for the outboard port propeller and the inboard starboard propeller are meshed directly with each other. However, an idler gear 27 is interposed between the gears 24 and 26 for the inboard port propeller and the outboard starboard propeller for reversing the direction of rotation of these propellers relative to their adjacent propellers for the well known purpose.

Each drive gear 26 is mounted on a drive shaft 28 which projects from and is rotated by the associated power source which, in the illustrated embodiment, comprises an engine 4 secured to the aircraft wing structure as mentioned previously.

In the embodiment illustrated in the FIG. 3 diagram, the power source defined by each engine preferably is of the known free power output turbine type. In this regard, reference is now directed to the outboard port engine shown cutaway in FIG. 3. It should be understood that the internal construction and hereinafter mentioned components of all four engines shown preferably are identical.

The aforementioned drive shaft 28 is operatively connected with the free power turbine section 29 of the engine. The free turbine section 29 in turn is driven by the gas generator section of the engine, which is generally designated 31, in the well known manner. Interposed between the drive gear 26 and the output turbine section 29 is a free wheeling unit 32 and a maximum take-off speed turbine governor unit 33.

The free wheeling unit 32 permits the associated turbine engine to be shut down while permitting continued rotation of its associated propeller. All propellers are interconnected, as will be described, so that all propellers will continue to rotate in the event of individual engine failure.

The free power turbine governor unit 33 normally will not be adjustable during flight, but is preset on the ground in the well known manner to preclude turbine speeds above a predetermined level. Governors 33 are used to establish the maximum propeller system operating r.p.m. when blade angle is being controlled manually as hereinafter described and the same are preferably pre-set for the maximum take-off rotational speed permitted.

The gas generator section 31 of the engine has a shaft 34 connected therewith and projecting therefrom with which a gas generator governor 36 is operatively connected. This governor is pilot controllable and is adjustable during engine operation for regulating the maximum gas generator power output imparted to the free turbine section 29 of each engine.

In this regard, each gas generator governor 36 is regulatable in any well known manner, such as by a pivotal link 37 operatively connected, through any suitable motion transmitting control means shown schematically by line 38, to a pilot operable lever 39 positioned at the pilot station.

Preferably, the four pilot control levers 39 for the four engines are ganged for movement in unison so that a pilot may change uniformly the power setting of each engine of the aircraft propulsion system with one hand. In this regard, forward displacement of the ganged control levers is designed to increase the control setting of the gas generator governors 36 while aft movement of the ganged control levers is designed to decrease the control setting of such governors.

In this same regard, it should be understood, however, that each of the control levers 39 is movable independently of the remaining control levers so that a given engine may be shut down if such action is required.

Again referring to the outboard port engine in FIG. 3, the fuel flow path to each engine is shown in dotted lines. Fuel from a suitable source flows first through a conduit designated by the line 41 into the free power turbine governor 33, thence through a conduit designated by line 42 into the gas generator governor 36, and thereafter through a conduit designated by line 43 into the gas generator section of the engine.

Because the fuel introduced into a given engine must pass through both governor units, it is not possible for the engine power output speed to exceed the pre-set maximum level of governor 33 or for the gas generator supplied power to exceed the power setting corresponding to the pilot set maximum level of governor 36.

The respective propeller constructions in the aircraft are operatively interconnected as mentioned previously. The interconnecting means in the embodiment illustrated comprises an elongated rotatable shaft 46 positionable in the wing structure which has four spaced bevel gears 47 mounted thereon for rotation therewith. Each bevel gear 47 in turn is meshed with a cooperable bevel gear 48 mounted for rotation on the propeller shaft 23 of each propeller construction. In this manner, rotation of each propeller at a speed conforming to the speed of rotation of all the other propellers is insured.

Mounted generally centrally of the shaft 46 is a fifth bevel gear 49, which is operatively connected by means of a cooperable meshed bevel gear 51 with governor means 52. The governor means chosen for this purpose may vary, but in the embodiment illustrated a simple centrifugal governor has been illustrated which comprises pivotal weights 53 which move radially in response to rotation of shaft 54 on which bevel gear 51 is mounted. As the weights move outwardly upon increased speed of rotation of shaft 54 by shaft 46, depression of a headed rod 55 against the effects of a spring 56 is effected for the purpose to be described. Conversely, upon decreased speed of rotation of shaft 54 in response to decreased speed of rotation of shaft 46, the weights pivot inwardly and the spring 56 effects movement of the rod 55 in the opposite direction.

The purpose of governor 52 will be described in more detail shortly.

As mentioned previously, the pitch setting of each propeller is adjustable by suitable mechanism in each hub 22. To this end, each pitch change mechanism in each hub is actuated in the embodiment illustrated by a motion transmitting means generally designated 61, which includes a flexible push-pull cable 62 movable through suitable guiding conduits so as to be effective for modifying propeller blade pitch in all aircraft wing positions. At one end 63, each control cable 62 is operatively secured by a connector 64 with a control member in the form of push-pull rod 66 which is slidable longitudinally in the hollow propeller shaft 23 and which is operatively connected with the pitch change mechanism in the propeller hub. Movement of rod 66 is effective for producing propeller blade pitch change in the manner disclosed, by way of example, in the aforementioned Mader patent.

With the illustration in FIG. 3, upward movement of each push-pull rod 66 in response to movement of cable 62 results in an increased blade pitch setting being effected while downward movement of shaft 66 effects a decreased blade pitch setting.

At its opposite end 67, each control cable 62 of the motion transmitting means is operatively connected with a slidable T-shaped rocker member 68. The two starboard propellers 6 are connected to the right end of the transverse arm 69 of the rocker member, while the two port propellers are operatively connected with the left end of such arm. As a result, movement of the rocker member upwardly, as viewed in FIG. 3, without tilting results in a uniform blade pitch increase for each propeller construction, while downward movement of the rocker member, as viewed in such figure, results in a uniform blade pitch decrease for all propellers.

Rocker member 68 also is mounted for pivotal movement about the axis of a centrally located pivot shaft 71 so that the transverse arm 69 thereof may be rotated clockwise or counterclockwise as desired. To this end, the depending arm 72 of the rocker member is pivotally connected with pilot operable control means in the form of a push-pull differential pitch input control link member 73. Upon movement of link 73 to the left as viewed in FIG. 3, the rocker member arm 69 will be rotated clockwise about pivot shaft 71 to effect differential but equal pitch change of the port and starboard propellers. That is, such clockwise rotation of rocker arm 69 will effect a uniform increase in the pitch setting of the two port propellers, while simultaneously effecting a uniform decrease in the blade pitch setting of the two starboard propellers.

Conversely, movement of link 73 to the right as viewed in FIG. 3 will effect counterclockwise rotation of the rocker arm 69 for effecting uniform decrease of the pitch setting of the two port propellers and uniform increase in the pitch setting of the two starboard propellers.

Movement of link 73 may be effected in any suitable manner, such as, for example, by a suitable pilot operable foot or hand control (not shown) located at the pilot's station. The actual control provided may, of course, be manual, automatic, or a combination of manual and automatic. The differential pitch change arrangement is operative in all wing positions so that, when the wing structure of the aircraft is arranged upright, differential pitch change will be effective for regulating roll of the aircraft while, when the wing is level, differential pitch change of the propellers can be employed for regulating yaw of the aircraft.

Means is provided in conjunction with the aforementioned governor 52 for acting upon rocker member 68 for effecting automatic pitch change settings of all propellers simultaneously and to equal degree in response to propeller over-speed or under-speed being sensed by the governor 52. Such means in the embodiment illustrated includes a fluid control arrangement operatively connected with the rocker member 68 for moving the rocker member upward or downward as described.

To this end, a primary control member in the form of a piston rod 76 is centrally connected with the transverse arm 69 of the rocker member in line with pivot shaft 71. The opposite end 77 of rod 76 is movably received in a hydraulic cylinder 78 and has a piston 79 secured thereto.

Movement of piston 79 for effecting movement of the rocker member actuating rod 76 is effected hydraulically in response to speed sensing by the governor 52. A pivot arm 81 is pivotally connected by pin 82 with aforementioned governor rod 55. At one end, arm 81 is connected pivotally by means of pin 83 to a link 84 which in turn is pivotally connected by pin 86 to a spool valve 87 or equivalent structure of the hydraulic system. Spool valve 87 is slidably positioned in a cylindrical guide cylinder 88.

At its other end, pivot arm 81 is operatively connected with a pilot operable governor control member in the form of a rotatable knob 91 which has a worm gear 92 on its end which is meshed with gear teeth 93 on the end of arm 81. It should be understood that with this arrangement pivot arm 81 is capable of pivotal movement within predetermined limits clockwise or counterclockwise relative to the worm gear 92 in response to movement of the governor rod 55 during increased or decreased speed of rotation of the respective propellers. The pilot operable control knob 91 is provided to permit the pilot to set the speed governor 52 at a predetermined value by pivoting arm 81 about the axis of pin 83 in a clockwise or counterclockwise direction to move governor rod 55 a predetermined amount until the desired governor setting is obtained in known manner.

With the arrangement shown, it should be understood that, upon increased speed of rotation of the propellers, the governor weights 53 will be pivoted outwardly under the effects of centrifugal force to depress rod 55 as viewed in FIG. 3, which in turn will move the hydraulic spool valve 87 downwardly in its guide cylinder 88. Conversely, as the propeller speed decreases, the weights 53 will be permitted to move inwardly of the governor which will permit spring 56 to raise governor rod 55 to move the spool valve 87 upwardly in guide cylinder 88.

During governor controlled operation, the hydraulic fluid used in the control system is introduced under pressure into conjunction with the spool valve 87 in the guide cylinder through a suitable conduit 97 connected with any suitable fluid source. Upon movement of the spool valve upwardly in response to decreased propeller speed, hydraulic fluid may flow through a connecting conduit 98 into piston cylinder 78 through a U-shaped conduit 99 which communicates with the upper and lower ends of the cylinder. The hereinafter described bypass valve structure selectively blocks conduit 99 to insure proper fluid flow so that fluid is introduced into contact with the upper surface of piston 79 to depress the same to effect a uniform decrease in the pitch setting of each propeller.

Conversely, upon movement of the spool valve 87 downwardly, hydraulic fluid may be introduced through another connecting conduit 101 into U-shaped conduit 99 and thence into engagement with the under surface of piston 79 to force the piston upwardly and to thereby automatically increase the pitch setting of each propeller. Preferably, pilot controllable overload release valves 102 and 103 are provided at opposite ends of the cylinder for safety purposes, and for pilot convenience to permit the pilot easily to overpower the action of the governor at any blade angle setting and easily to shift from the governing to the manually controlled regime and conversely.

A selectively actuated bypass valve structure 104 is employed in the fluid system for insuring or precluding movement of the piston 79 in response to actuation of the spool valve 87 by the governor 52. Valve structure 104 includes a slidable spool valve 105 therein.

When the bypass valve 105 is in the position shown in solid lines in FIG. 3, the fluid introduced into the system will take the path of least resistance and will travel in a circular path between conduits 98 and 101 and the short section of conduit 99 lying therebetween. However, when the bypass valve 104 is in the dotted line position shown in FIG. 3, the conduit 99 is blocked between conduits 98 and 101 so that the pressure fluid introduced into the system must flow into the cylinder 78 into engagement with the piston for effecting movement thereof.

That is, it should be understood that when the bypass valve 105 is in the open position speed governor 52 will be ineffective to effect pitch change of propellers, while, when the valve is in the closed position, governor 52 will be effective in the manner described for automatically effecting controlled pitch change.

An important feature of this invention resides in the provision of pilot operable control means for positioning the bypass valve 105 in its opened or closed position selectively so that the speed governor 52 may be rendered effective or ineffective as desired relative to the propeller pitch setting.

To this end, an auxiliary movable control member 106 is provided in the control system which has an enlarged cam 107 at one end thereof. The bypass valve 105 is spring urged by coil spring 108 into engagement with member 106. In this regard, when the member 106 is in the solid line position shown in FIG. 3, cam 107 holds the bypass valve in the open position. However, when the control member 106 is moved to the dotted line position, the bypass valve is moved under the effect of its associated spring 108 to the dotted line closed position.

A tapered shoulder 109 merges the cam 107 with the smaller diameter portion 110 of the control member to effect smooth actuation of the bypass valve 105 when the control member is moved.

The control member 106 in the illustrated embodiment has a housing 111 connected to one end thereof from which a pilot operable control knob 112 projects. Knob 112 is mounted on a slidable shaft 113 in the housing which has a tapered pawl 114 on one end thereof. The pawl 114 is spring urged to the right as seen in FIG. 3 into engagement with a generally U-shaped immovable gauge member 116 through the opposite arms 117 and 118 of which the aforementioned piston rod 76 is slidable. The arms of member 116 limit the extent of movement of the control member 106 relative to the bypass valve 105.

Housing 111 relative to which pawl 114 is movable also is secured to the piston rod 76 for movement therewith so that control member 106 and piston rod 76 move in unison. As a result, if the aircraft pilot grasps knob 112 and moves the same upwardly or downwardly, as viewed in FIG. 3, piston rod 76 will be moved therewith so that a manual change in the blade pitch setting of all the propellers may be effected.

The gauge member 116 is effectively divided into two blade pitch control zones, designated G and M in FIG. 3, by a projecting stop 121. When pawl 114 is positioned in the lower or M (for manual) control zone, the bypass valve 105 is maintained open by cam 107 so that governor controlled pitch change is not possible and so that all pitch change may be manually effected by the pilot as desired through control knob 112. The length of control zone M is defined generally by the length of the cam 107 of the control member.

Control member 106 and piston rod 76 may be manually moved upwardly by the control knob 112 until the pawl clears the stop 121 and passes into the upper or G (for governor) control zone. That is, the pawl may be moved into the upper automatic governing zone G at which time the bypass valve 105 is closed so that the pitch change of the propellers thereafter is effected automatically in response to actuation of the propeller speed governer 52 as described previously.

From the foregoing, it should be understood that when the control knob 112 and its associated pawl 114 are in the automatic governing zone G, pitch change normally is regulated automatically through the hydraulic system in response to operation of the governor 52. However, when the control knob 112 and its associated pawl 114 are manually positioned in the lower manual zone M, the governor 52 is ineffective for regulating propeller pitch change and such pitch change is effected manually by the pilot.

As a pilot convenience, the gauge member 116 preferably is provided with a detent 123 in the manual control zone which designates a zero pitch setting for the propellers. The control knob 112 preferably is located with pawl 114 engaged with the zero pitch detent 123 when the engines are started. A negative blade pitch setting is effected if the control pawl is moved below the zero pitch detent.

When the control knob is positioned in the automatic governing zone, the propeller blade pitch is automatically regulated by the speed governor 52 in response to the power output setting of the engines as determined by the pilot through the ganged control levers 39. However, when the control knob is in the manual control zone, the power output setting of the engines has no effect on the blade pitch setting.

From the foregoing it should be understood that an important feature of this invention resides in an automatic control system which includes manually operable means for deactivating an automatic blade pitch control system operable in response to a propeller speed governor under certain flight conditions. In this connection, the automatic governing arrangement preferably is employed when the aircraft is in forward cruise flight, while the manual override control is employed under other selected conditions, such as when the aircraft is moving vertically or hovering or, if desired, when the aircraft is taxiing on the ground.

It should be understood that the pilot control knob 112 in an aircraft installation is located conveniently at the pilot station for ready access by the pilot so that the pilot at any time desired may overcome the control effect of the governor 52 and assume manual control of the uniform blade pitch setting.

The subject control system will now be briefly described with respect to a given series of flight operations.

Prior to starting of engines 4, the pilot control knob 112 preferably would be set in or near the zero thrust detent 123, and would remain in such position while the engines were started. Thereafter, if desired taxiing of the aircraft with the wing level could be effected at low engine power output settings and consequent low propeller speed by using the control knob to modify the blade pitch setting to change the thrust produced by the propellers. By thus using low propeller speeds during taxiing, blade damage due to flying stones and other objects can be minimized.

Conventional fixed wing type take-offs with the wing level or vertical take-offs with the wing upright can be effected in the following manner. The engine output control levers 39 would be set in low speed ground-idle position. The manual pitch control knob 112 would be engaged with the low pitch stop 121 in the automatic governing range G. Thereafter, the control levers 39 would be moved forward to the full power position to apply full take-off power to the respective engines of the aircraft.

Hovering and transitional flight accelerations and decelerations normally would be accomplished by using the manual control knob 112 of the control system. Under such conditions the engine power control levers would be set in the full power positions. The speed of rotation of the propellers in such arrangement would be limited to the maximum take-off value by the free power turbine governors 33 mentioned previously.

During forward cruise flight the control knob 112 is positioned in the automatic governing range.

In returning from the forward cruise conditions to conditions for vertical landing, the aircraft air speed would be reduced to a low value by moving the engine output control levers 39 aft until the governor 52 has brought the propeller control pawl down into contact with the low pitch stop 121, at which time the propeller r.p.m. will have fallen below the maximum take-off r.p.m. Thereafter, the control knob 112 may be moved from the automatic governing range G into the manual range M, following which the power output control levers 39 would again be moved to the full power take-off position. Then the propeller pitch setting is regulated manually for vertical landing.

Having thus made a full disclosure of a preferred embodiment of this invention relating to a control system for a VTOL aircraft, it should be understood that other modifications thereto are contemplated as falling within the spirit and scope of this invention as defined by the appended claims.

I claim:

1. A tilt-wing VTOL aircraft comprising a fuselage, wing structure extending transversely of said fuselage and pivotal relative thereto between a level position and an upright position, a plurality of thrust producing variable pitch propellers mounted on said wing structure for pivotal movement therewith, at least one propeller being positioned on each side of said fuselage, means operatively interconnecting said propellers for rotation at generally the same speed, and a control system for modifying in unison the pitch of said propellers; said control system comprising governor means operatively connected with said means interconnecting said propellers for sensing the speed of rotation of said propellers and for responding to speeds above and below a predetermined value, fluid control means actuatable by said governor means in response to propeller overspeed or underspeed, motion transmitting means operatively connected with said propellers for modifying in unison the pitch of said propellers in response to said governor means, and pilot operable override means including bypass valve structure controllable by the pilot of said aircraft for rendering inoperative said fluid control means so that the pitch of said propellers may be selectively controlled directly by said pilot.

2. The aircraft of claim 1 which includes a manual pilot control member, and a cam member selectively movable by said manual pilot control member into and out of operative engagement with said bypass valve structure, said cam member being effective to hold said valve structure open when said pilot control member is positioned within a first predetermined control zone, said cam member permitting said valve structure to close when said pilot control member is positioned within a second predetermined control zone.

3. A tilt-wing VTOL aircraft comprising a fuselage, wing structure extending transversely of said fuselage and pivotal relative thereto between a level position and an upright position, a plurality of thrust producing variable pitch propellers symmetrically mounted on said wing structure for pivotal movement therewith, said wing structure having at least one propeller on each of the port and starboard sides of said fuselage, means for rotating said propellers, means operatively interconnecting said propellers for rotation at the same speed, governor means operatively connected with and actuated by said interconnecting means for sensing the speed of rotation of said propellers and for responding to speeds above and below a predetermined value, a fluid valve actuatable by said governor means, a fluid actuatable piston movably received in a fluid cylinder, conduit means for introducing fluid into said cylinder for actuating said piston, said conduit means being selectively and automatically opened and closed by said fluid valve in response to overspeed and underspeed actuation of said governor means, mechanism actuatable by movement of said piston for increasing and decreasing the pitch of said propellers in unison in response to such overspeed and underspeed, bypass valve structure in conjunction with said conduit means for diverting fluid from said cylinder when said bypass valve structure is open and for insuring introduction of such fluid into said cylinder when such valve structure is closed, and a pilot operable control member manually actuatable by the pilot of said aircraft for selectively opening and closing said bypass valve structure so that said governor responsive piston may be selectively deactivated, said control member being operatively connected with said pitch increase and decrease mechanism so that said control member when said bypass valve structure is open may be employed to manually increase and decrease the pitch of said propellers.

4. The aircraft of claim 3 which includes another pilot operable control member operatively connected with said pitch increase and decrease mechanism for differentially activating said mechanism for modifying the pitch of said starboard propeller differentially relative to the pitch of said port propeller.

5. A tilt-wing VTOL aircraft comprising a fuselage, wing structure extending transversely of said fuselage and pivotal relative thereto between a level position and an upright position, a plurality of thrust producing variable pitch propellers mounted on said wing structure for pivotal movement therewith, at least one propeller being positioned on each side of said fuselage, means operatively interconnecting said propellers for rotation at generally the same speed, and a control system for modifying in unison the pitch of said propellers; said control system comprising governor means for sensing the speed of rotation of said propellers and for responding to speeds above and below a predetermined value, means including motion transmitting mechanism responsive to said governor means for automatically effecting a change in pitch of said propellers in response to propeller overspeed or underspeed, and override means controllable by the pilot of said aircraft for selectively deactivating said governor responsive means so that the pitch of said propellers may be selectively controlled directly by said pilot; said governor responsive means including a fluid actuated piston actuatable by said governor means and operatively connected with said motion transmitting mechanism; said override means including a bypass valve structure for effectively diverting fluid normally intended for actuation of said piston.

References Cited in the file of this patent
UNITED STATES PATENTS

| | | |
|---|---|---|
| 2,280,654 | Mader | Apr. 21, 1942 |
| 2,317,340 | Bennett | Apr. 27, 1943 |
| 2,936,968 | Mazzitelli | May 17, 1960 |

OTHER REFERENCES

Interavia, No. 2/1959, page 166, February 1959.
Aviation Week, June 11, 1962, page 69.